United States Patent [19]
Mueller et al.

[11] Patent Number: 5,323,476
[45] Date of Patent: Jun. 21, 1994

[54] APPARATUS FOR INCREASING THE CROSS SECTION OF OPTICAL WAVES

[75] Inventors: Gustav Mueller; Lothar Stoll, both of Munich; Bernd Sauer, Freising, all of Fed. Rep. of Germany

[73] Assignee: Siemens Aktiengesellschaft, Munich, Fed. Rep. of Germany

[21] Appl. No.: 91,912

[22] Filed: Jul. 16, 1993

[30] Foreign Application Priority Data

Aug. 14, 1992 [DE] Fed. Rep. of Germany ....... 4227045

[51] Int. Cl.$^5$ .............................................. G02B 6/26
[52] U.S. Cl. ........................................ 385/43; 385/50; 385/132
[58] Field of Search ................ 385/27, 28, 32, 39, 385/43, 50, 129, 130, 132

[56] References Cited

U.S. PATENT DOCUMENTS

| | | | |
|---|---|---|---|
| 4,415,227 | 11/1983 | Unger | 385/43 |
| 4,678,267 | 7/1987 | Burns et al. | 385/43 |
| 4,886,538 | 12/1989 | Mahapatra | 65/30.13 |
| 5,078,516 | 1/1992 | Kapon et al. | 385/129 |
| 5,125,065 | 6/1992 | Stoll et al. | 385/130 |
| 5,135,935 | 10/1992 | Mueller | 385/50 |
| 5,142,596 | 8/1992 | Mizuuchi et al. | 385/43 |
| 5,199,092 | 3/1993 | Stegmueller | 385/50 |
| 5,265,177 | 11/1993 | Cho et al. | 385/14 |

FOREIGN PATENT DOCUMENTS

4030756A1  4/1992  Fed. Rep. of Germany .

Primary Examiner—Frank Gonzalez
Attorney, Agent, or Firm—Hill, Steadman & Simpson

[57] ABSTRACT

An apparatus for converting an optical wave having a relatively smaller cross section into an optical wave having a relatively larger cross section which may be manufactured in a monolithically integrated fashion in a simple way. In this apparatus, a wave-guiding, rib-shaped taper having an end for coupling the optical wave with a small cross section into the taper is fashioned on a rib of a rib waveguide which guides the optical wave. An optical wave having a larger cross section is fashioned thereon in a longitudinal direction of the rib. The infeed end of the taper and the taper itself has a smaller breadth in comparison to the breadth of the rib of the rib waveguide. Proceeding from this end, the taper broadens and decreasingly tapers in thickness in the longitudinal direction of the rib waveguide.

13 Claims, 4 Drawing Sheets

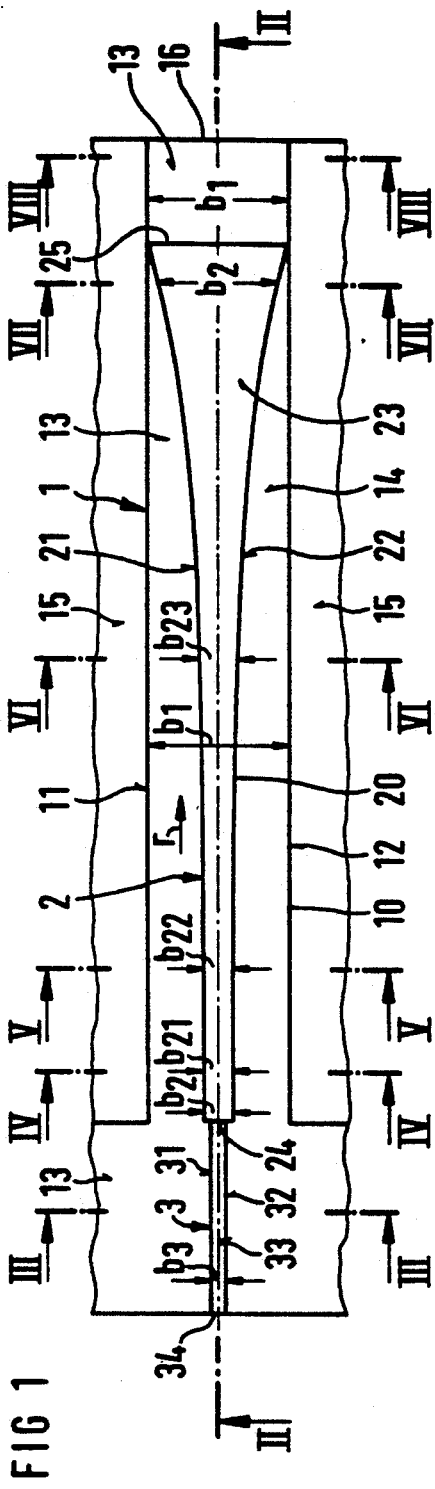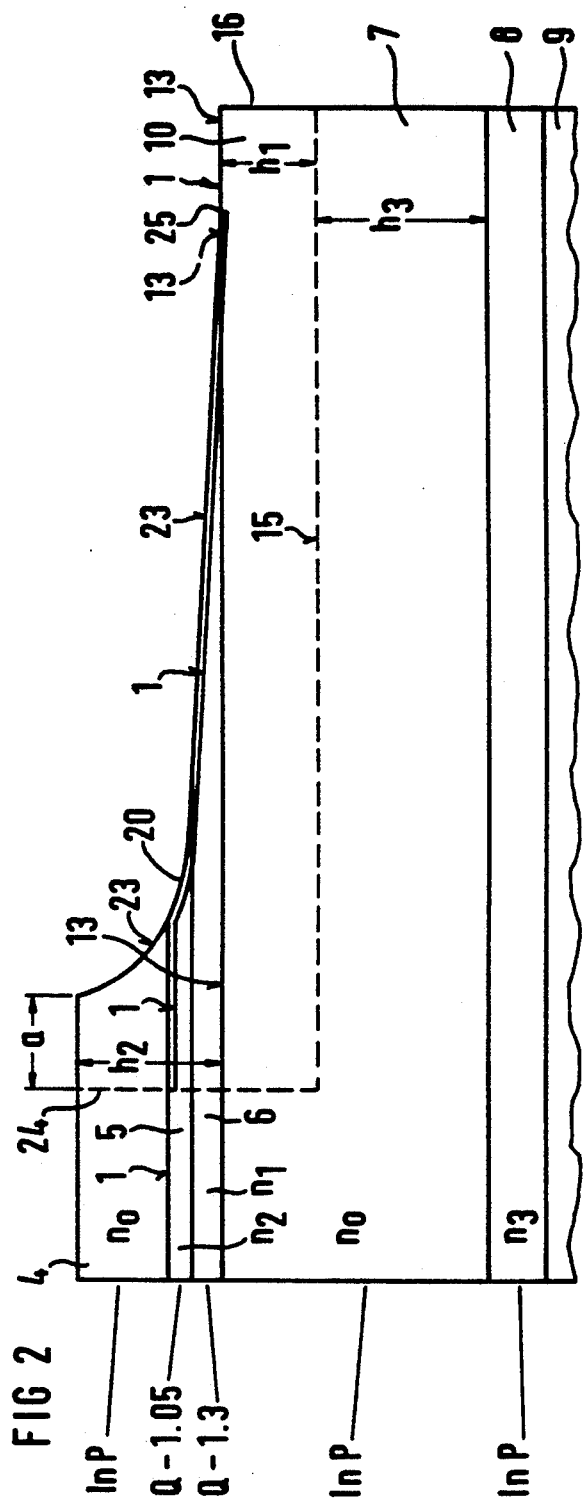
FIG 1
FIG 2

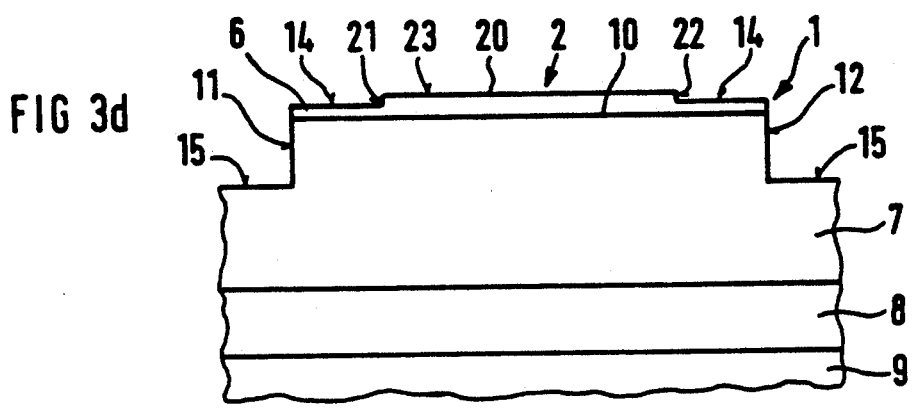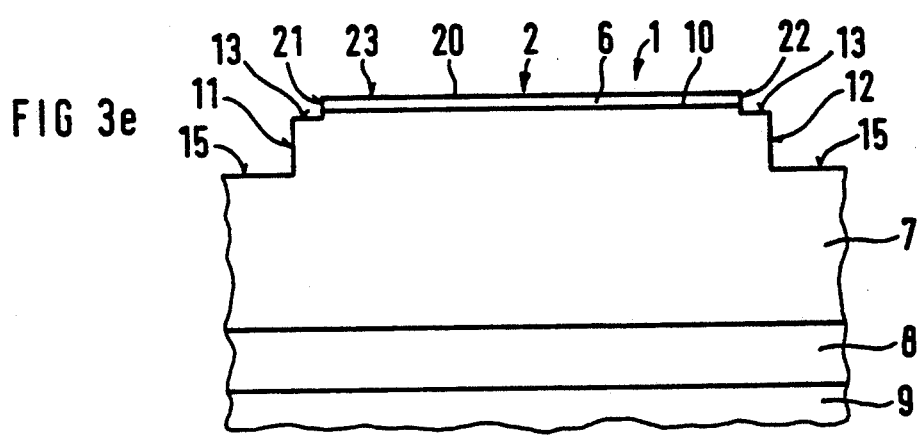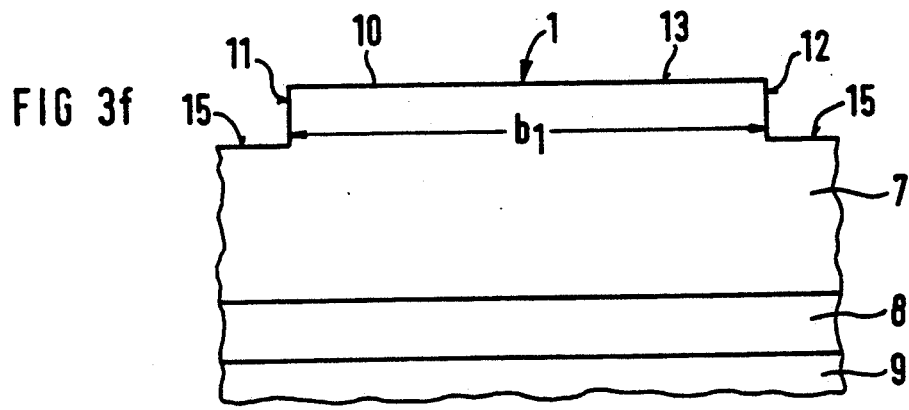

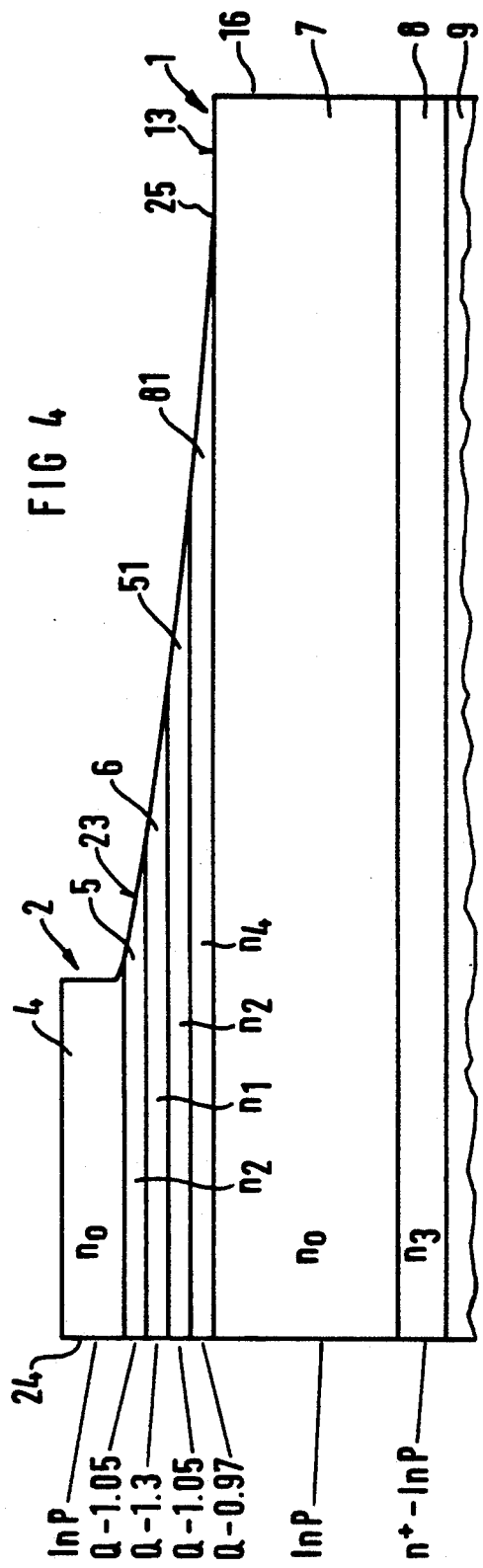
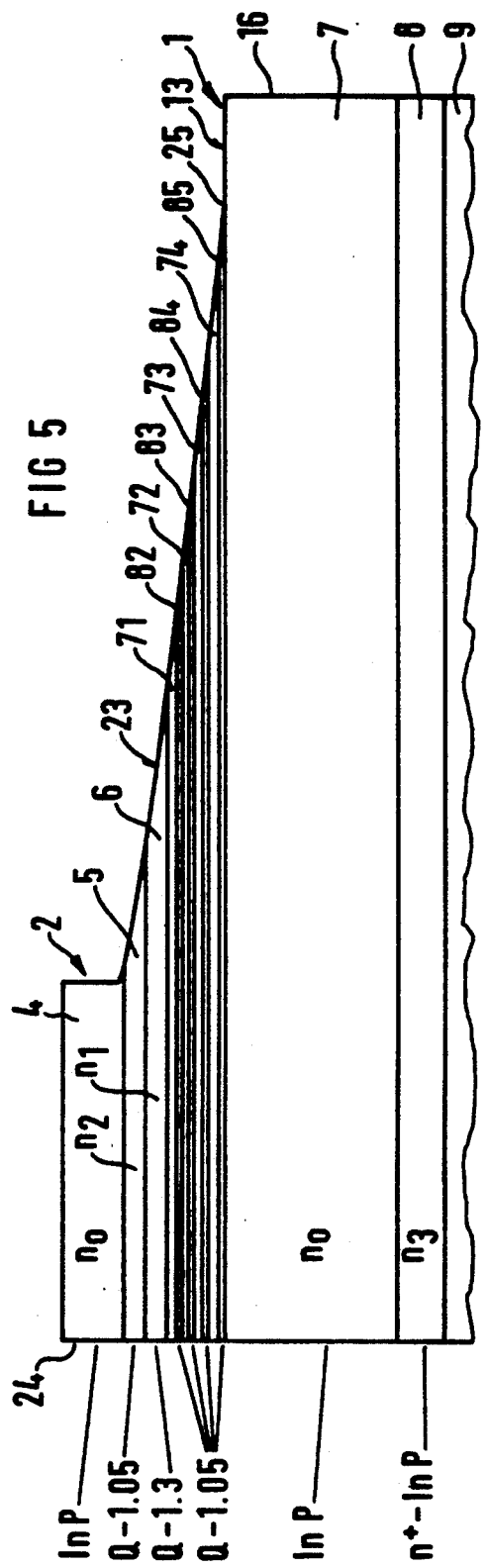

APPARATUS FOR INCREASING THE CROSS SECTION OF OPTICAL WAVES

BACKGROUND OF THE INVENTION

1. Field of the Invention

The present invention is directed to an apparatus for converting an optical wave having a relatively smaller cross section into an optical wave having a relatively larger cross section.

2. Description of the Prior Art

Coupling optical semiconductor components to monomode optical fibers produces inefficiencies. The different optical spot sizes, wave forms, and modes conducted in the components and fibers make it necessary to match the different spot sizes shapes and modes, alternatively known as cross sections of the optical waves, to one another in order to achieve high coupling efficiencies.

This matching, for example, can ensue with an arrangement of microlenses. However, this approach requires, at a minimum, an involved precision adjustment.

An integrated-optical apparatus of the species initially cited is disclosed in European Application 0 495 292. The mode conversion is already implemented in a semiconductor chip. The monomode fiber can be coupled to the semiconductor chip by simple butt coupling in low-loss fashion and with high adjustment tolerances.

The known integrated-optical apparatus is well-suited for integration with an over-grown waveguide structure having a small spot width of the guided, optical wave. A complicated manufacturing process is required having a plurality of epitaxial steps. The rib waveguides employed in optical switches, for example, are disclosed in European Application 0 415 225 and German OS 40 30 756.

SUMMARY OF THE INVENTION

It is an object of the present invention to provide an apparatus of the type initially cited that can be manufactured monolithically integrated in a simple manner.

The above object is achieved in accordance with the principles of the present invention in an apparatus having a rib of breadth $b_1$ of a rib waveguide, wherein said rib has a wave-guiding rib-shaped taper. This taper has an infeed end of breadth $b_2$ (less than $b_1$) for coupling a smaller optical wave into said taper. Also, said taper broadens in breadth $b_2$ and decreases in thickness $h_2$ in a longitudinal direction along said rib.

The present invention has the advantage of providing for simple manufacture of a monolithically integrated apparatus which enables the transformation of the mode of the passive rib waveguide into a fiber-matched mode. As in the known integrated optical apparatus described above, the present invention may be coupled to the fiber by employing simple butt-coupling in a low-loss fashion and with high adjustment tolerances.

BRIEF DESCRIPTION OF THE DRAWINGS

The invention shall be set forth in greater detail by way of example with reference to the figures.

FIG. 1 is a plan view of an exemplary embodiment of the invention.

FIG. 2 is a side view of the invention taken along section line II—II in FIG. 1.

FIGS. 3a through 3f are cross sectional views of the invention respectively taken along section lines III-—III, IV—IV, V—V, VI—VI, VII—VII, and VIII-—VIII in FIG. 1.

FIGS. 4 and 5 are sectional views respectively depicting two examples of the invention modified slightly in comparison to the example of FIGS. 1 and 2.

DESCRIPTION OF THE PREFERRED EMBODIMENTS

Figure 3A:
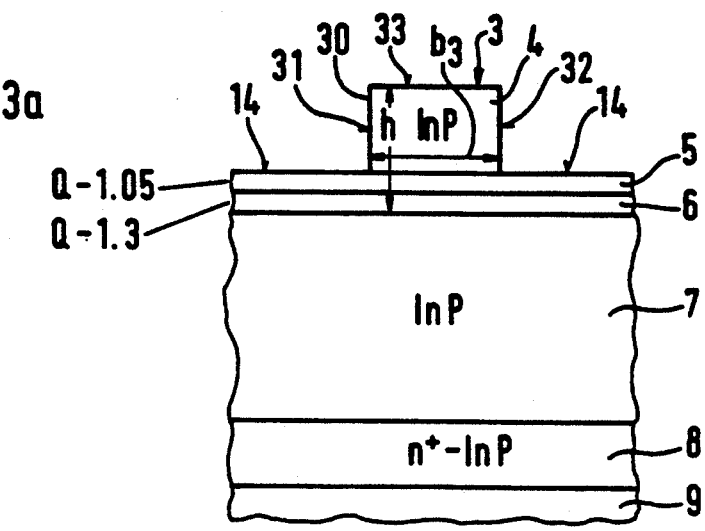
Figure 3B:
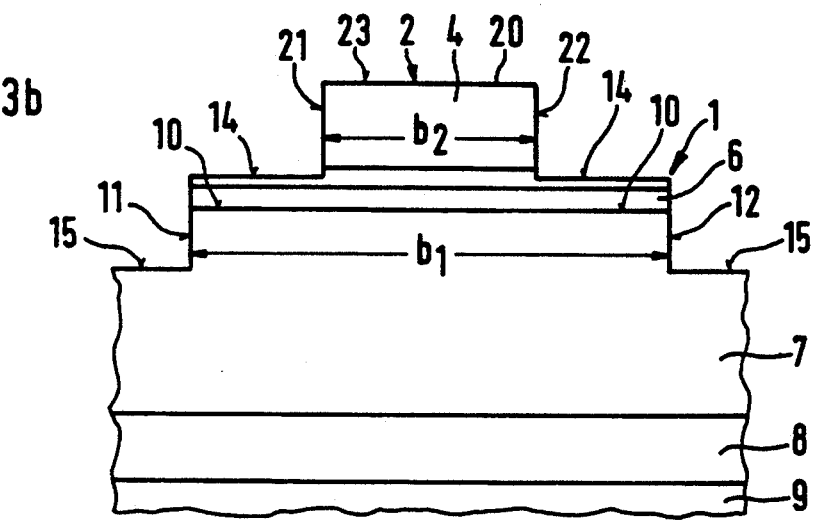
Figure 3C:
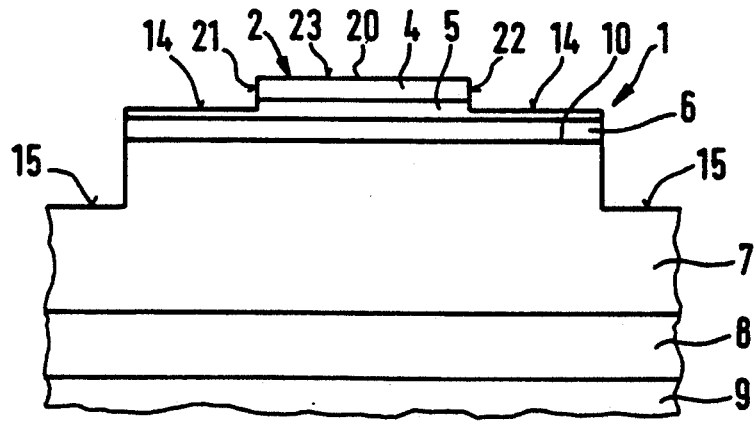

In the example of FIGS. 1, 2 and 3a through 3f, a layer 8 is applied on a substrate 9. An elongated rib 10 having lateral limiting surfaces 11 and 12 and a surface 13 is formed on the surface of this layer 8. This rib 10 is elevated in comparison to the lower-lying surface 15 of the layer 7 and has a uniform breadth $b_1$ and height or thickness $h_1$.

This layer 7 together with the elongated rib 10 essentially forms the rib waveguide 1 for guiding the optical wave having the larger cross section. The wave is guided in this case in the region of the rib 10 and under this rib 10 in the layer 7 in longitudinal direction r of the rib 10. The layer 8 essentially functions as a cladding layer that downwardly limits the rib waveguide 1. Thus, the refractive index $n_3$ of this layer 8 must be lower than the refractive index $n_0$ of the layer 7.

Similar to the case of the exemplary taper set forth below, the rib waveguide 1 could also be fashioned such that a separate waveguide layer having a higher refractive index in comparison to its surroundings, particularly in comparison to the rib 10 as well, is fashioned in the layer 7 under the rib 10. The optical wave is essentially guided in this separate waveguide layer under the rib 10.

Given a known, larger cross section of the optical wave to be guided, the breadth $b_1$ and the thickness $h_1$ as well as the thickness $h_3$ of the layer 7 between the surface 15 and the layer 8, are to be matched to the dimensions or shape of the optical wave cross section guided in the rib waveguide 1.

The wave guiding, rib-shaped taper 2 having its end 24 for coupling the optical wave with the smaller cross section into this taper 2 is fashioned on the surface 13 of the rib 10 of the rib waveguide 1. This taper 2 proceeds in a longitudinal direction r along the rib 10 of the rib waveguide 1. The rib-shaped taper 2 is essentially limited by lateral limiting surfaces 21 and 22 and by a surface 23 lying between these limiting surfaces 21 and 22 and its end 24. The rib-shaped taper 2 has a thickness $h_2$ and a breadth $b_2$ that is smaller in comparison to the breadth $b_1$ of the rib 10 of the rib waveguide 1.

Given a known smaller cross section of the optical wave to be coupled in, the breadth $b_2$ and the thickness $h_2$, are to be matched to the dimensions or shape of this smaller cross section of the optical wave. The wave is coupled into the taper 2 and guided in a longitudinal direction r of the rib 10 of the rib waveguide 1. An optimally close matching of the end 24 to this smaller cross section is preferred.

The breadth $b_2$ of the taper 2 gradually broadens, proceeding from its narrow end 24, in the longitudinal direction r of the rib 10 of the rib waveguide 1, to the breadth $b_1$ of this rib 10. For example, the taper 2 broadens in accord with the curved course of the lateral surfaces 21 and 22 of the taper 2 visible in FIG. 1, whereby the breadth $b_1$ of the rib 10 is reached at the other end 25 of the taper 2.

Proceeding from its narrow end 24, the thickness $h_2$ of the taper 2 simultaneously tapers in a decreasing manner in the longitudinal direction r of the rib 10 of the rib waveguide 1, tapering gradually to zero.

Following an initial section having an essentially constant thickness, for example, the taper 2 tapers according to the curved course of the surface 23 of the taper 2 visible in FIG. 2, whereby the thickness $h_2=0$ is reached at the other end 25 of the taper 2.

The shape of the taper 2, i.e. the course of the lateral surfaces 21 and 22 and of the surface 23, is preferably selected such that a loss-free or at least low-loss transformation of the optical wave having the smaller cross section coupled into the taper 2 into the optical wave of the larger cross section is derived. The shape of the taper 2 that is optimum for this purpose can be easily identified by iterative trials or computationally.

The optical wave guided along in the taper 2 couples through the surface 13 of the rib 10 into the rib waveguide 1. After reaching the other end of the taper 2, the optical wave is forwarded in this rib waveguide 1 as the wave having the larger cross section, being carried up to an outfeed end 16 of the rib waveguide 1. An optical fiber (not shown) may be butt-coupled to this outfeed end 16.

The optical wave having the smaller cross section to be coupled into the taper 2 is preferably supplied to the end 24. The smaller cross section wave is supplied thereto through a rib waveguide 3 at the infeed side that can be co-integrated on the same substrate 9 (whose cross-sectional dimensions are closely matched to those of the cross section of the optical wave having the smaller cross section). This rib waveguide 3 of the infeed side comprises a rib limited by lateral surfaces 31 and 32 and by a surface 33 and has an infeed end 34 through which the optical wave having the smaller cross section can be coupled. A semiconductor component from which such a wave emerges can be coupled to this infeed end 34. The breadth $b_3$ of the rib 30 of the rib waveguide 3 at the infeed side is preferably slightly smaller than the breadth $b_2$ of the taper 2 at the end 24. This results in a low-loss coupling of the rib waveguide 3 of the infeed side to the taper 2.

A particular advantage of the invention is that the waveguide 3 of the infeed side and the taper 2 can be fashioned in the same layer or in the same layer structure. As a result, all layers that are required for the rib waveguide 1, for the rib waveguide 3 of the infeed side and for the taper 2 can be advantageously grown in a single epitaxial process.

In the example of FIGS. 1, 2 and 3a through 3f, the rib waveguide 3 of the infeed side and the rib-shaped taper 2 are fashioned in a layer structure applied on the rib 10 of the rib waveguide 1. This layer structure has the following: a waveguide layer 6 having a refractive index $n_1$ that is higher relative to the refractive index $n_0$ of the rib 10; a cladding layer 5 applied on the waveguide layer 6 having a refractive index $n_2$ that is lower than the refractive index $n_1$ of the waveguide layer 6; and a further layer 4 applied on the cladding layer 5 and having a refractive index, e.g., the refractive index $n_0$, that is lower in comparison to the refractive index $n_1$ of the waveguide layer.

As shown in the cross section of FIGS. 3a through 3f, a part of the layer structure extends over the entire width of the rib 10 of the rib waveguide 1. This is true in the case of FIGS. 3a through 3c for the cladding layer 5 and for the waveguide layer 6 and is true only of the waveguide layer 6 in the case of FIG. 3d. The breadth of the waveguide 3 at the infeed side, however, is defined only by the breadth $b_3$ of the rib 30 limited by the lateral surfaces 31 and 32 and by the surface 33. The optical wave having the smaller cross section is guided in the waveguide layer 6 under the rib 30, so that the parts of the layer structure lying laterally next to the rib 30 can be eliminated, although this approach may have drawbacks associated with manufacturing this type of structure. This, however, would not be beneficial for certain manufacturing-related reasons. The same is also true of the taper 2, whose breadth is defined only by the breadth $b_2$ of the rib 20 limited by the lateral surfaces 21 and 22 and by the surface 23 which varies in longitudinal direction r of the rib 10 of the rib waveguide 1.

In this example, the substrate 9 is composed of InP, the layer 8 is composed of $n^+$-doped InP, the layer 7 having the rib 10 is composed of InP, the waveguide layer 6 is composed of quaternary material Q-1.3, the cladding layer 5 is composed of quaternary material Q-1.05 and the layer 4 is composed of InP.

The example of FIG. 4 differs from the example of FIGS. 1 and 2 only in that two further layers 51 and 81 are arranged between the waveguide layer 6 and the surface 13 of the rib 10 of the rib waveguide 1. The layer 51 adjoins the waveguide layer 6 and is composed of the material Q-1.05, whereas the layer 81 adjoins the rib 10 and is composed of the quaternary material Q-0.97. Such additional layers, have the advantage of allowing for increased manufacturing tolerances.

This feature is also true of the example according to FIG. 5, which only differs from the example of FIGS. 1 and 2 in that four layers 71 through 74 of InP and four layers 82 through 85 of the material Q-1.05 that alternate with one another are arranged between the waveguide layer 6 and the surface 13 of the rib 10 of the rib waveguide 1. The layers 82 through 85 are arranged at an increasing distance from one another in the direction from the waveguide 6 toward the layer 8.

An embodiment of this invention can be manufactured by using a method described in detail in German Patent Application GR 92 P 1505 DE having the same filing date. For example, the manufacturing process is accomplished in the following way:

A layer packet composed of the layers for the rib waveguide 1 and the taper 2 or the taper 2 and the rib waveguide 3 of the infeed side is grown onto the surface of a substrate in a single epitaxial process.

The grown-on layer packet is covered with a uniformly thick layer of positive photoresist that is only exposed in the region between the lines 21, 22, 24 and 25 in FIG. 1 or is additionally exposed between the lines 31 and 32. The exposure, however, is such that the exposure dose in the direction r in FIG. 1 decreases according to the curve 23 in FIG. 2 from a maximum exposure dose at 34 or 24 to the exposure dose 0 at 25. After the development of the photoresist layer exposed in this way, only a taper-shaped strip of developed photoresist remains on the layer packet, this strip corresponding in shape and size to the taper 2 of FIGS. 1 and 2.

This strip-shaped taper of photoresist is eroded with an erosion process that erodes both the photoresist as well as the material of the layer packet that is free of photoresist and/or becomes free of photoresist. As a result, the strip-shaped taper of photoresist is transferred into the layer packet. A reactive ion beam etching process with $N_2$ and $O_2$ as etching gas is suitable as an erosion process.

The initial thickness of the photoresist layer is to be selected such that the layer packet outside of the photoresist is eroded in the erosion process down to the surface of the layer or layers that is or are provided for the rib waveguide 1 having the rib 10. Also, the uppermost layer of the layer packet is essentially preserved under the greatest layer thickness of the developed photoresist strip.

In a further lithography step, the rib waveguide 1 having the rib 10 can be produced by traditional etching.

The exposure for manufacturing the taper-shaped strip of photoresist can be undertaken with a topically continuously varying exposure dose. It is simpler to employ an exposure dose that topically varies in steps. A wafer stepper which may be used to very simply produce the step-shaped profile by multiple exposure.

Although various minor modifications may be suggested by those versed in the art, it should be understood that we wish to embody within the scope of the patent granted hereon all such modifications as reasonably and properly come within the scope of our contribution to the art.

We claim:

1. Apparatus for converting an optical wave having a relatively smaller cross section into an optical wave having a relatively larger cross section, comprising:
   a rib of a rib waveguide, said rib having a breadth $b_1$;
   said rib having a wave-guiding rib-shaped taper thereon, said taper having an end of breadth $b_2$ less than the breadth $b_1$ for coupling a smaller optical wave into said taper, said taper proceeding in a longitudinal direction r of said rib from said end while broadening in breadth $b_2$ and tapering decreasingly in thickness $h_2$.

2. The apparatus of claim 1, wherein said breadth $b_2$ of said taper broadens to the full breadth $b_1$ of said rib.

3. The apparatus of claim 1, wherein of said thickness $h_2$ of said taper tapers decreasingly to zero.

4. The apparatus of claim 2, wherein the thickness $h_2$ of said taper tapers decreasingly to zero.

5. The apparatus of claim 4, having a common location at which the breadth $b_2$ of said taper equals $b_1$ and the thickness $h_2$ equals zero.

6. The apparatus of claim 5, wherein the thickness $h_2$ of said taper decreases in steps.

7. The apparatus of claim 5, wherein the breadth $b_2$ of said taper increases in steps.

8. The apparatus of claim 5, wherein the thickness $h_2$ decreases in steps and the breadth $b_2$ increases in steps.

9. The apparatus of claim 1, wherein said taper has a layer structure disposed on said rib of said rib waveguide, said layer structure having a waveguide layer with a refractive index ($n_1$) that is higher than the refractive index ($n_0$) of said rib; a cladding layer having a refractive index ($n_2$) that is lower than the refractive index ($n_1$) of said waveguide layer disposed on said waveguide layer; and a further layer having a refractive index ($n_0$) that is lower than said refractive index ($n_1$) of said waveguide layer disposed on said cladding layer.

10. The apparatus of claim 9, wherein said waveguide layer is disposed directly on said rib of said rib waveguide.

11. The apparatus of claim 9, wherein said layer structure further has two layers disposed between said rib of said rib waveguide and said waveguide layer, said two layers having respective refractive indices ($n_2$, $n_4$) which are lower than the refractive index ($n_1$) of said waveguide layer.

12. The apparatus of claim 9, said layer structure further includes a plurality of more than two layers disposed between said rib of said rib waveguide and said waveguide layer with alternating layers in said plurality having respective refractive indices $n_0$ and $n_3$ which are lower than the refractive index ($n_1$) of said waveguide layer.

13. The apparatus of claim 12, wherein said plurality of layers between said rib and said waveguide layer are arranged at an increasing distance from one another.

* * * * *